United States Patent [19]
Schiesser

[11] 3,889,562
[45] June 17, 1975

[54] INSTALLATION FOR PIECE-BY-PIECE THROUGHPUT OF ROLLED RUBBER SHEETS OUT OF A COOLING UNIT

[75] Inventor: Walter Hugo Schiesser, Zurich, Switzerland

[73] Assignee: Schiesser AG, Zurich, Switzerland

[22] Filed: May 18, 1973

[21] Appl. No.: 361,837

[30] Foreign Application Priority Data
June 13, 1972 Germany.............................. 2228728

[52] U.S. Cl. .................... 83/94; 83/92; 83/153; 83/167; 83/170; 83/176; 83/280; 83/409; 83/455; 83/488
[51] Int. Cl................ B26d 7/02; B65h 35/06
[58] Field of Search ......... 83/94, 92, 153, 170, 409, 83/488, 455, 280, 167, 20, 176

[56] References Cited
UNITED STATES PATENTS

| | | |
|---|---|---|
| 2,452,312 | 10/1948 | McMurray............................ 83/176 |
| 2,539,240 | 1/1951 | Firestone........................ 83/176 X |
| 2,715,941 | 8/1955 | Rankin et al. ....................... 83/176 |
| 2,855,046 | 10/1958 | Brunsting et al................. 83/176 X |
| 2,917,959 | 12/1959 | Senzani........................... 83/176 X |
| 3,267,782 | 8/1966 | Benzing .................................. 83/94 |

*Primary Examiner*—Frank T. Yost

[57] ABSTRACT

An apparatus for treatment of pressed rubber sheets upon removal from a conveyor carrying the pressed rubber sheets through a cooling chamber. Means are provided for retaining the individual sheets on the conveyor with each of the sheets being individually folded upon itself and retained upon a hold-down bar in hairpin fashion. Clamping means and cooperatively arranged cutting means are provided for severing the pressed rubber sheet upon the fold area prior to delivery of the sheet to a receiving station.

16 Claims, 6 Drawing Figures

INSTALLATION FOR PIECE-BY-PIECE THROUGHPUT OF ROLLED RUBBER SHEETS OUT OF A COOLING UNIT

BACKGROUND OF THE INVENTION

The invention concerns an apparatus for piece-by-piece delivery of pressed rubber sheets from the output side of a cooling apparatus, and more particularly to such an apparatus where each pressed rubber sheet is individually laid onto an associated hold-down bar with the center portion thereof being folded on itself in hairpin fashion, with both ends hanging downwardly, and wherein the hold-down bars, extending parallel to one another at a spaced apart interval, are coupled to a conveyor and affect a feed motion perpendicular to the longitudinal direction. Intermittently retractable and advanceable clamping jaws or pincers extending parallel to the hold-down bars are provided on the side opposite the output side of the cooling apparatus, for the purpose of gripping or grasping each of the pressed rubber sheets fed onto each hold-down bar at the point of the top fold. Following the horizontal retraction of the hold-down bar, the pressed rubber sheets that are laid over one another in halves are deposited onto a pallet arranged below the field of motion on the clamps or pincers.

There is a presently known arangement of the general type mentioned wherein the pressed rubber sheet is deposited onto the pallet while in the folded condition while permitting the fold to remain as is. The result from this procedure is that the two halves of the pressed rubber sheet lie flat, on one another, over the greater portion of their surfaces, with exception of the region of the fold where a bulge is created. If a number of folded pressed rubber sheets are laid in superimposed relationship, one over the other, an increasingly upwardly slanting deposit surface is obtained which causes the thus-formed stack of overlaid pressed rubber sheets to side-slip and fall over. To prevent this in the presently known arrangement, the pallet receiving the deposit of the pressed rubber sheets is turned 180° after each pressed rubber sheet is deposited thereon so that the bulges formed at the fold points of the pressed rubber sheets are of equal height on both sides of the pallet. With increasing stack height in this arrangement, there arises a deposit surface that sags downwardly from the outer ends toward the center. This indeed does permit over-layment of a number of pressed rubber sheets without toppling of the stack, however, there is the disadvantage that the stack height is limited by the bulges created at the fold points of the pressed rubber sheets, and not by the thickness of the pressed rubber sheets themselves. Moreover, prior to carrying out a subsequent work operation required on the sheet, further processing of the pressed rubber sheet is necessary in that the folds must be cut by a special apparatus, or manually. Summarizing, with the known arrangement, one obtains at the expense of having to rotate or index a pallet 180° for each sheet, a stack of pressed rubber sheets is obtained which is relatively high on both sides, with the height of the overall stack appreciably exceeding the sum of the thickness of the layers of pressed rubber sheets lying one on top of the other. Furthermore and additionally, there is required a further or separate apparatus for cutting the pressed rubber sheets.

SUMMARY OF THE INVENTION

It is a primary object of the present invention to provide an improved arrangement, relative to the above, which, in addition to piece-by-piece delivery of the pressed rubber sheets from the cooling apparatus in the manner described, renders it possible to cut the pressed rubber sheet at the fold point, and in the same operation, deposit a pair of rubber panels onto the pallet instead of a single folded pressed rubber sheet. This result is achieved since there is provided within the clamps or pincers a cutting arrangement that is synchronized in its motion or travel, relative to the cooling installation to form a cut through the fold portion of the pressed rubber sheet before depositing onto the pallet, thus making it possible to deliver two separate overlying panels.

Through means of the arrangement of the cutting apparatus that is provided in accordance with the invention, ti is possible to effectively utilize the working stroke required for the return movement of the clamps or pincers for the purpose of forming a cut through the pressed rubber sheet, whereby the pressed rubber sheet is placed onto the pallet, in the form of two separated, evenly overlying panels. This results in a very stable stack that can be stacked or layered higher than with the present state of the art, and furthermore achieve a low stack height per number of deposited pressed rubber sheets. A separate and subsequent operational arrangement may be disposed adjacent personnel normally assigned to cut the pressed rubber sheets at their fold points whereby the pressed rubber sheets, after being deposited onto the pallets, can be immediately fed into adjacently disposed processing equipment for further operations, for example, into a press for fabrication of pressed items, or into blank dies for further processing in presses.

The invention is explained in more detail in the following specification, with the aid of the drawings.

DESCRIPTION OF THE PREFERRED EMBODIMENT

Figure 1:
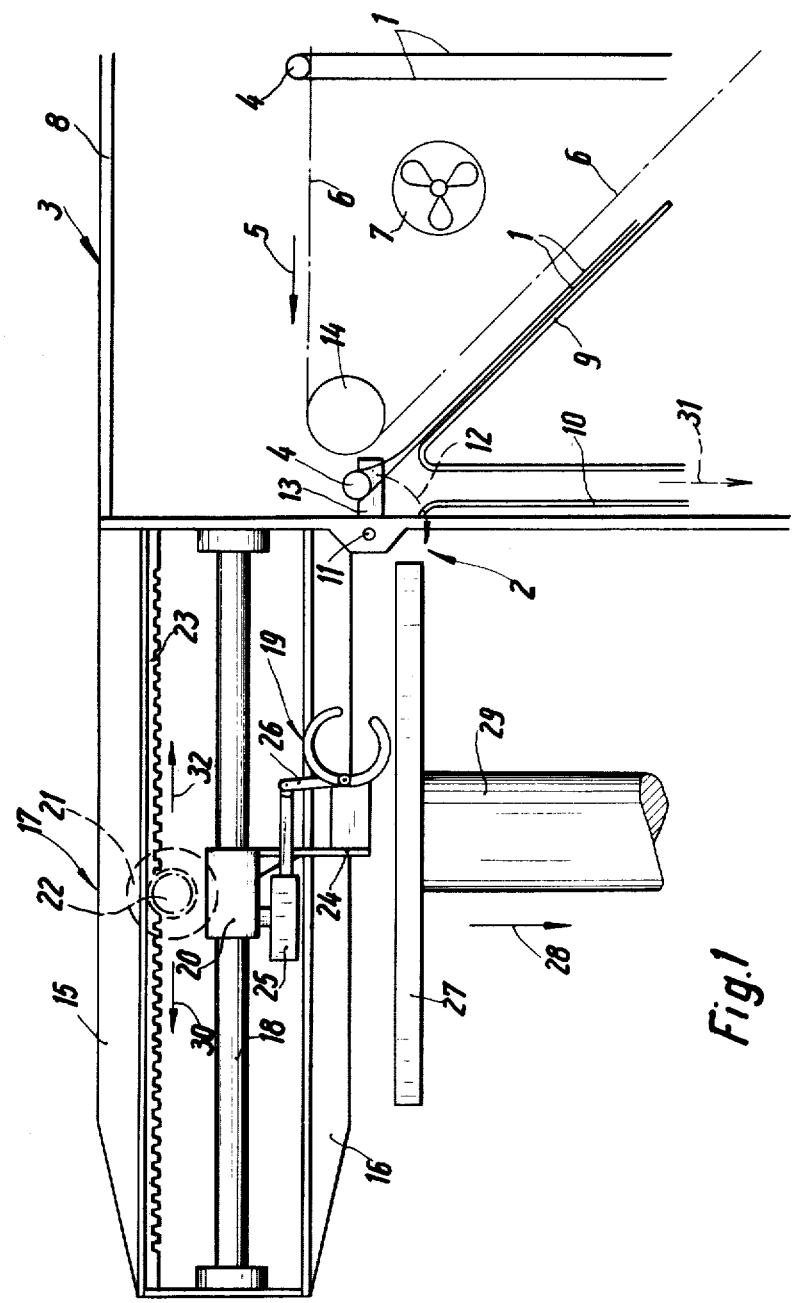
FIG. 1 is a view of an example of one embodiment of the arrangement in accordance with the present invention, in a side as well as schematic view, in a simplified representation.
Figure 2:
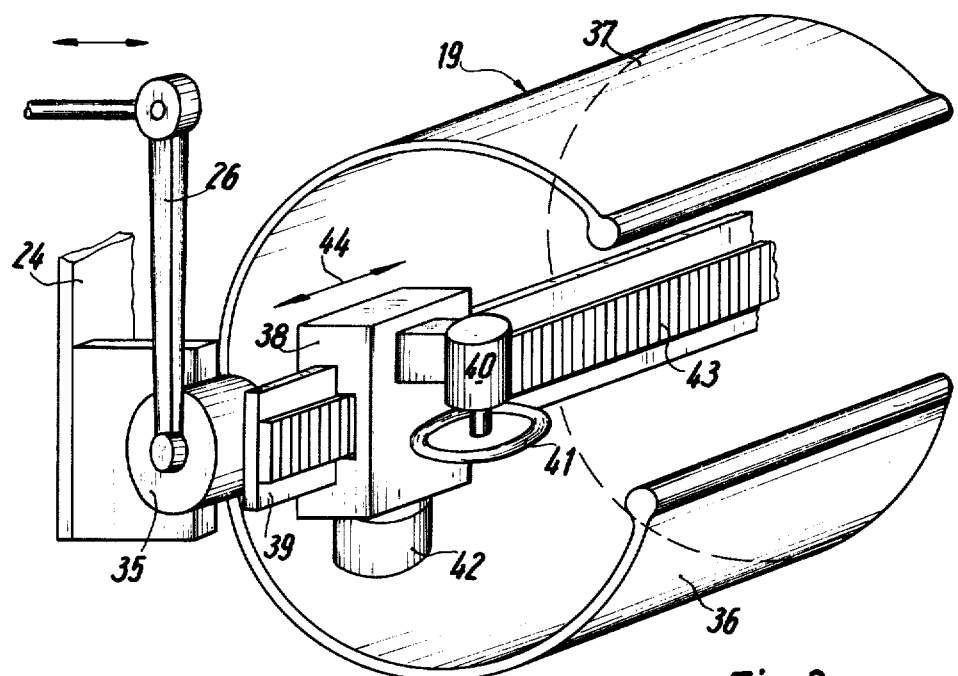
FIG. 2 is a view of the clamp or pincers forming a component part of the arrangement in accordance with FIG. 1, for the purpose of gripping or grasping pressed rubber sheets, this view being shown in perspective, in a simplified partial representation.
Figure 3:
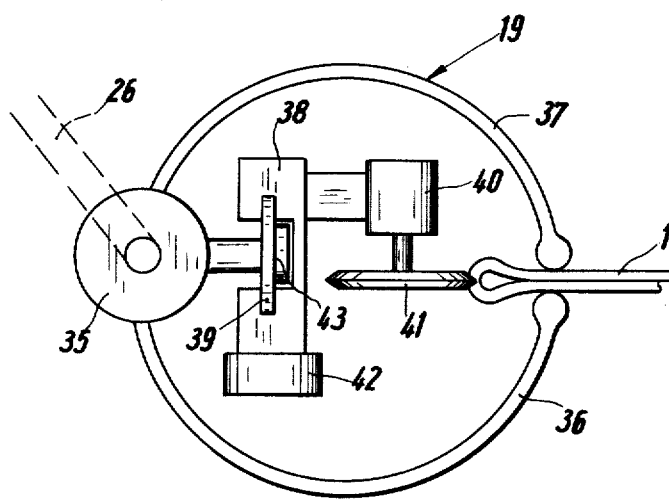
FIG. 3 is a side view of the clamp or pincers that is in accordance with FIG. 2.

In accordance with the arrangement illustrated in FIGS. 1–3, and in accordance with the present invention, it will be appreciated that the arrangement serves for the piece-by-piece removal of pressed rubber sheets 1 from the output side 2 of a cooling installation 3. In the cooling installation 3, each pressed rubber sheet 1 is individually laid onto a hold-down bar 4 in hairpin fashion, with both ends hanging downwardly. In FIG. 1 there are only two pressed rubber sheets 1—1, where, at the extreme right hand side, the pressed rubber sheet is shown and described in the desired position, from the point of view of FIG. 1, while to the left, a pressed rubber sheet 1, on the output side 2 of cooling installation 3, is shown in a special position which will be more completely described and explained later. The hold-down bars 4 which extend and run at spaced parallel intervals, one to another, are connected to a conveyor through means of a pair of drive chains 6, as indicated in FIG. 1 by the dash-dot lines and rotating in the direction of a horizontal arrow 5. For purposes of clarity, only one chain of the pair is shown. The hold-down bars 4, each with either end attached to drive chains 6, produces a forward movement in the direction of the arrow 5, which extends perpendicular to the axial direction. There is provided in the cooling apparatus at least one cooling fan 7 which, in the representation of FIG. 1, generates a stream of cooling air perpendicular to the plane of the view as well as parallel to the surfaces of pressed rubber sheet 1. This occurs inside a closed cooling chamber 8 that forms a component part of the cooling installation. On the output side 2 of the cooling installation 3 there is provided a diagonally disposed deposit surface 9 along with a vertical dropout chute 10 for arranging subsequent hold-down bars at any time following removal of the pressed rubber sheet 1 that is deposited thereon as will be more fully explained later.

A pair of projecting supports 13, pivotable in the direction of a broken line arrow 12 in motion about an axis 11, defines, in a plane vertical to the plane of the sketch of FIG. 1, an interval which is large relative to the width of the pressed rubber sheet 1, but which is less than the length of hold-down bars 4. The drive chains 6, whose opposing side is disposed at an interval perpendicular to the plane of the view of FIG. 1, provide a space corresponding approximately to that of the two projecting supports 13 so that the pressed rubber sheets 1 which are laid onto the hold-down bars 4 can hang downwardly in the indicated manner. The chains 6—6 are fed about guide pulleys 14 on the output side of the cooling installation so that, while running, the hold-down bars 4 along with the pressed rubber sheets hanging over them are laid onto the projecting supports 13, at time-separated intervals, as shown in FIG. 1 and particularly wherein the associated pressed rubber sheet 1 comes to rest on the diagonally upwardly sloping deposit surface 9. The cooling installation that has been described here is not deemed to be a component part of the invention and is explained merely for the purpose of making more clear the operational mode of one embodiment of the invention.

A delivery apron 17 consisting of upper and lower rails 15 and 16 is provided on the output side 2 of cooling installation 3, displaying a clamping or pincer slide guide 18 for receiving a clamp or pincer slide 20 and carrying along with it a clamp or pincers 19. The slide 20 supports a reversible pincers slide motor 21 (shown in phantom) which drives a pinion 22 which is in mesh with a horizontal pincers rack slide 23 which is, in turn, attached to delivery apron 17. The clamp or pincers 19 is joined to the slide 20 through means of the oppositely located, upwardly extending rod 24, with the slide 20 additionally accepting a pneumatic or hydraulic clamp or pincers actuating-positioning member 25 which is illustrated in the form of a piston/cylinder assembly. The actuating-positioning member 25 actuates upon clamp or pincers 19 through its rod as well as through a positioning lever 26 associated with clamping jaw or pincers 19 to provide the motion for opening or closing the jaw. Below delivery apron 17 there is a pallet 27 arranged on support shaft 29 which moves downwardly, step fashion, and which is actuated pneumatically or hydraulically in the direction of arrow 28, with the step-fashion downward motion corresponding to the thickness and weight of the two overlaid halves of a pressed rubber sheet 1.

In operation, slide 20, at the beginning of the working cycle, is in a different position than that one shown in FIG. 1, that is, at an extreme left hand position from output side 2 of cooling installation 3, and wherein the travel of slide 20 in the direction of arrow 32 toward the right is synchronized with an independently operating drive chain 6. At this point in time, only one hold-down bar 4 lies on the projecting supports 13 and the pressed rubber sheet 1 associated with this hold-down bar lies against the diagonal deposit surface 9. Accordingly, likewise in a time-synchronized coordination after the slide 20 has reached its extreme right hand position immediately adjacent the output side 2 of cooling installation 3, the actuating-positioning member 25 is actuated in the direction toward closure of the jaw formed by pincers 19 whereby the pressed rubber sheet 1 lying against the deposit surface 9 is grasped at its folded area. Thereafter, slide 20 returns in the direction of arrow 30, for example from the view of FIG. 1 toward the left, whereby the pressed rubber sheet 1 on the associated hold-down bar 4, which cannot otherwise move away from the cooling installation 3 nor its output side 2, is drawn leftwardly across pallet 27 and laid thereon. After complete removal of pressed rubber sheet 1 from the associated hold-down rod 4 lying on the projecting supports 13, for example upon attaining an extreme left hand position for slide 20 (from the view of FIG. 1,) the projecting supports 13 are pivoted vertically downwardly in the direction of the broken line arrow 12 so that the corresponding hold-down bar 4 falls down into the discharge chute 10, as shown by a broken line arrow 31. The hold-down bar 4 cast off in this manner reaches a collector (not shown) and is thereafter fed into the input side (not shown) of cooling installation 3 where a renewed engagement follows on the side of the drive chain 6. After this event, the projecting supports 13 are again brought into the horizontal position in accordance with FIG. 1 and are then ready to receive a new hold-down bar 4 along with the pressed rubber sheet 1 hanging over it. After deposit of a hold-down bar 4 along with the pressed rubber sheet 1 carried thereon onto the projecting supports 13, the slide motor 21 is reversed in direction so that slide 20 once again travels in a direction of arrow 32 to the output side 2 of the cooling installation where the work cycle described above is repeated in its entirety.

Insofar as described up to this point, the arrangement associated with delivery apron 17 for the piece-by-piece removal of pressed rubber sheets from the output side 2 of cooling installation 3 is state-of-the-art and does not include the characteristics of the present invention, but rather, the foregoing explanations are necessary in the interest of a clear understanding of the idea of the invention to be explained further on.

In accordance with FIGS. 2 and 3, each side of clamp or pincers 19 is provided with a gear unit 35 for coupling the movement of the two members forming the jaw of the clamp or pincers, wherein each gear unit 35 is connected to rod 24 which has already been explained herein in connection with FIG. 1. In FIG. 2, clamp or pincers 19 is shown with two jaw elements 36 and 37 that extend over the entire width of the pressed rubber sheet, it being understood, however, that instead of having jaws that are closely coupled, it is also possible to provide a group of spaced jaws.

Independent of the special structure of jaw elements 36 and 37 of pincers 19, a movable slide 38 running between jaw elements 36 and 37, as well as the corresponding groups of jaws, is located on T-rails 39 arranged parallel to jaw elements 36 and 37 as well as to the hold-down bars 4, forming a component portion of a cutting arrangement. The slide runs over the entire jaw width of pincers 19 from one gear until 35 to the other and therein locked in place. Slide 38 includes a cutting disk 41, driven by a motor 40, with the disk plane being parallel to the plane of motion of pincers 19 and extending symmetrically with the jaws 36 and 37. Coupled with slide 38 is a slide drive, in the form of an electrical motor 42, for the purpose of moving the slide 38 over the entire width of the pincers as well as the width of the pressed rubber sheet during the return movement, with this motion being synchronized with the return movement of the slide as well as the return movement of the entire jaw of pincers 19, and also synchronized relative to cooling installation 3. Electrical motor 42 drives a pinion (not shown) that is on slide 38 which pinion is in contacting engagement with a rack 43, attached to a T-rail 39 which runs parallel to the pincers jaws. Instead of electrical motor 42, it is possible also to provide an air-driven motor or other type of positioning motor.

The electrical motor 42 forming the slide drive is, in each case, designed to be reversible as well as controllable so that slide 38 is movable in both directions, as is shown by a double headed arrow 44 in FIG. 2. In accordance with one example or embodiment, the slide drive and electrical motor 42 can be constructed to return the slide to its original position on a predetermined side of pincers 19, after depositing the pressed rubber sheet 1 onto pallet 27. Alternatively, this may be accomplished during the following forward movement of pincers 19 against the output side 2 of cooling installation 3, for example, on that side shown in FIG. 2. In accordance with still another example or embodiment, the slide drive and electrical motor 42 can, selectively, after deposit of the pressed rubber sheet 1 onto pallet 27 as well as after the following forward movement of pincers 19 against the output side 2 of cooling installation 3, be switched and driven in the reverse direction, with the return movement of the pincers. In the first example above, motor 40 can retain its direction of rotation and, therefore, does not need to be constructed to be reversible, while in accordance with the second example, the direction of motor 40 is preferably made to be reversible, as will be explained more fully in the following.

In operation, the fold of the pressed rubber sheet 1, after closure of jaw elements 36 and 37 of pincers 19, is grasped by means of lever 26, as shown in FIG. 3, such that the fold portion of pressed rubber sheet 1 lies in the path of cutting disk 41. During the return movement of pincers slide 20 in the direction of arrow 30 of FIG. 1, slide 38 is now driven parallel to the closed jaw elements 36 and 37 by means of electrical motor 42, with the cutting disk rotating from that position shown in FIG. 2 in a direction corresponding to the right end of double arrow 44 in FIG. 2. The speed of movement of slide 38 is established such that immediately prior to the termination of the return movement of pincers slide 20, and also immediately prior to opening of jaw elements 36 and 37 of pincers 19 for the purpose of depositing the pressed rubber sheet 1 onto pallet 27, slide 38 has run through its entire path of travel, whereby the fold of the pressed rubberr sheet 1 which has been grasped by pincers 19, is cut through across its entire width. Thus there is obtained two separate completely cut rubber sections, or pressed rubber sheet halves, which can be laid onto pallet 27 in flat condition.

During the cutting of pressed rubber sheet 1 at the fold as well as during its separation into two halves, the direction of rotation of cutting disk 41 is preferably selected such that it corresponds with a peripheral motion which is counter to the existing direction of motion of the slide relative to the surface of the pressed rubber sheet 1. In other words, the tangential component of the circumferential speed of cutting disk 41 at the point of contact with the pressed rubber sheet 1 is aimed at being counter to the translation motion of cutting disk 41, which is transferred through slide 38.

If, however, the cutting disk 41 is always driven in the same direction, that is to say if motor 40 is not reversible, the slide drive along with electrical motor 42 should be driven in opposite directions immediately after opening of clamps or pincers 19 during return positioning of pincers slide 20, whereby slide 38 again attains its original position (for example that shown in FIG. 2) during the forward movement of pincers slide 20 against the output side 2 of cooling installation 3. Thus, during a following return movement of slide 20 upon grasping another pressed rubber sheet 1, cutting disk 41 again displays the optimal desired direction of rotation. If, however, the motor 40 is constructed to be reversible, slide 38 need be driven only once during a full operating cycle of the slide 20, during the return movement corresponding to the direction of arrow 30 of FIG. 1. The slide, along with electrical motor 42 remain at rest during the forward movement of slide 20 according to arrow 32 of FIG. 1. With a renewed return movement of slide 20, corresponding to arrow 30 of FIG. 1, motor 40 along with its cutting disk 41, as well as electrical motor 42 with slide 38 will be driven in the reverse direction, whereby optimum directional rotation of cutting disk 41 is again obtained.

In accordance with a further example or embodiment of the invention, not shown, the slide drive for slide 38 can utilize in place of electrical motor 42, a hydraulic cylinder, running parallel to the T-rails and having a stroke corresponding to the amplitude of the movement of slide 38.

Figure 4:
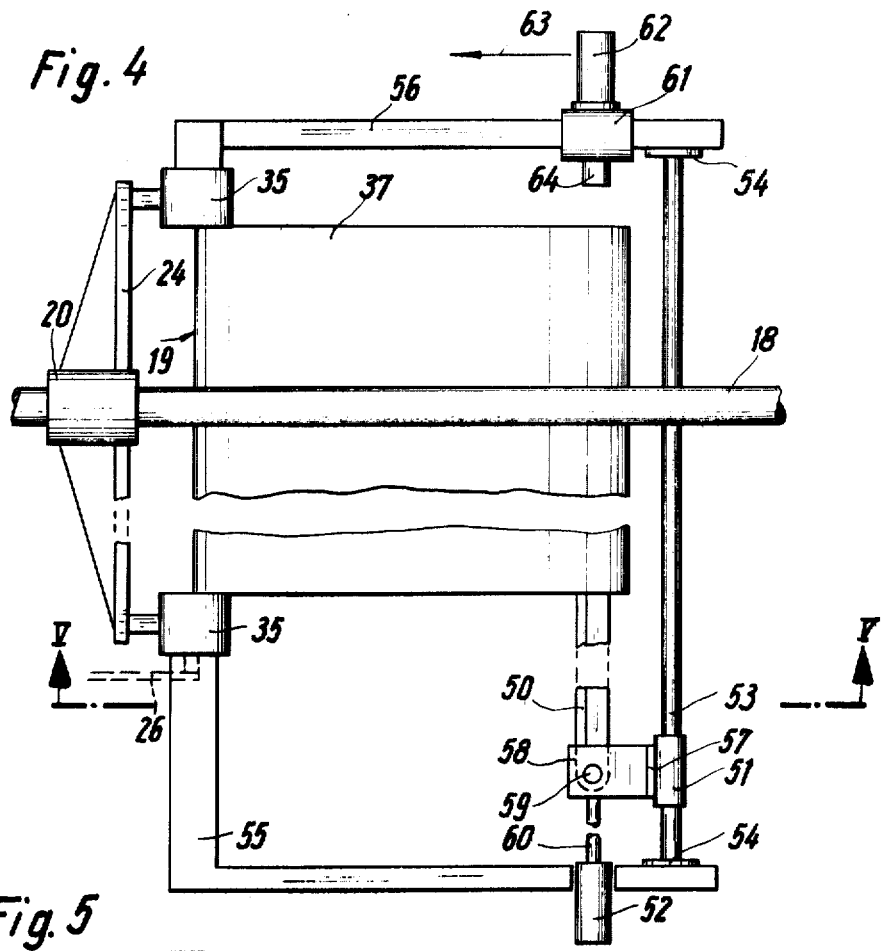
FIG. 4 is an example of embodiment for an arrangement in accordance with the invention, developed relative to FIGS. 1–3, with this view being a top view and also a simplified representation.
Figure 5:
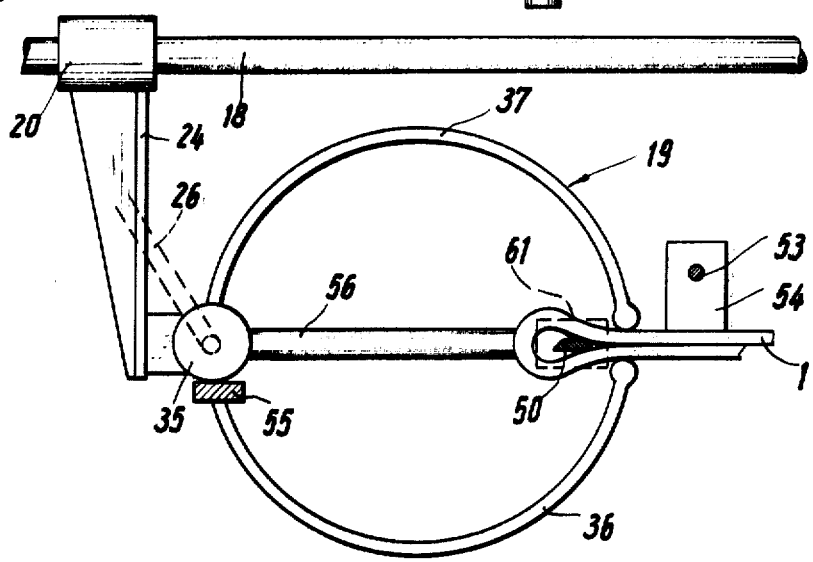
FIG. 5 is a sectional view taken along the line V—V of FIG. 4.

In accordance with FIGS. 4 and 5 which utilize the same reference numerals as in FIGS. 1–3 insofar as they apply to same or similar components, adjacent one side of pincers 19 (lower portion of FIG. 4) and in a plane of movement of the pincers, there is a bar knife 50 that is movably supported through means of a bar knife slide 51 supported on pincers 19, running between jaw elements 36 and 37 as well as parallel and related to the output side 2 of cooling installation 3, behind the closure gap of jaw elements 36 and 37. The bar knife slide 51 is laterally movable out of the jaw of the pincers, as shown in FIG. 4, through means of an associated positioning member 52, in FIGS. 4 and 5, which is in the form of a pneumatic or hydraulic piston/cylinder assembly. Motion occurs prior to or during the forward movement of the pincers to the output side 2 of cooling installation 3, and parallel to the jaw elements 36 and 37, while bar knife 50, after gripping the fold of pressed rubber sheet 1, as is shown in FIG. 5, is inwardly movable into the jaw of the pincers which is disposed between its two positions. The bar knife slide 51 is movably supported on a guide 53 which is connected at either end to a support rod 55 as well as a slide guide 56 by means of bearings 54. Guide 53 is laid somewhat higher than the gap between jaw elements 36 and 37 so that guide 53 does not hinder grasping of the pressed rubber sheet 1. Bar knife slide 51 is rigidly connected with a bearing block 58 for the bar knife 50, through a bearing rod 57, wherein a pivot pin 59 is provided in bearing block 58 for the purpose of pivoting bar knife 50.

A piston rod 60 of positioning member 52 which is rigidly connected to bearing bar 55, operates against bearing block 58 so that the bar knife 50 can be fed into pincers 19 with jaw elements 36 and 37 closed, as shown in FIG. 5.

The slide guide 56 movably picks up a bar knife actuating, driving, and angularly deviating slide 61 which is provided with a forward driving apparatus 62, in the form of a positioning motor. Motor 62 moves bar knife 50 which is movable within pincers 19, against the concave inner surface of the fold in the pressed rubber sheet. Bar knife 50 is pivoted about the vertical pivot pin 59 of the bar knife slide 51, as well as of the rigidly connected bearing block 58. It is further understood that with the bar knife 50 fully moved into pincers 19, the pivot pin 59 lies outside of pincers 19 and, indeed, is preferably quite some distance laterally outside of pincers 19 so that, upon movement of the bar knife slide 61 in the direction of an arrow 63, that portion of bar knife 50 also simultaneously moves against the concave inner surface of the fold in the pressed rubber sheet 1. This is effective on that side of the clamps or pincers which is turned away from bar knife deviating slide 61. In other words, the distance of the pivot pin 59 from one side of clamps or pincers 19 (lower portion in the view of FIG. 4), with bar knife 50 fully moved into pincers 19, corresponds therefore to an essential portion of the length of the bar knife.

In operation, if the slide 20 finds itself in its forward position on the output side 2 of cooling installation 3 and pincers 19, after closure, has grasped the pressed rubber sheet 1, the arrangement in accordance with FIGS. 4 and 5 actuates positioning member 52, whereupon bar knife 50 is moved into pincers 19, and, indeed, through the cross-section formed by the fold in the pressed rubber sheet 1 (FIG. 5) until the free end of bar knife 50 is grasped by a pick-up 64 in bar knife slide 61. Accordingly, the forward drive arrangement 62 for the bar knife slide 61 is switched by means of a control (not shown) so that the bar knife slide 61 runs in the direction of arrow 63, begins to cut and slide along the fold of pressed rubber sheet 1, starting from the side of pincers 19 that adjoins bar knife slide 61 until, after a corresponding pivoting of bar knife 50 about pivot pin 59, the cut is extended up to that side of the clamp or pincers which adjoins bar knife slide 61.

In accordance with a further embodiment (not shown in FIGS. 4 and 5), a bar knife forward driving arrangement can be constructed in addition to a pivoting of bar knife 50 about pivot pin 59 for the purpose of moving forward the pivot pin 59 in the direction against the concave inner surface of the fold in the pressed rubber sheet, wherein, however, this forward drive is less than the forward pivoting movement of the free end of bar knife 50 that is turned away from pivot pin 59. In other words, it would therefore be possible to provide a positioning member similar to bar knife deviating slide 61 which moves the pivot pin 59 relative to bar knife deviating slide 61, parallel to bar knife deviating slide 61, however at a slower speed relative to the latter.

Figure 6:
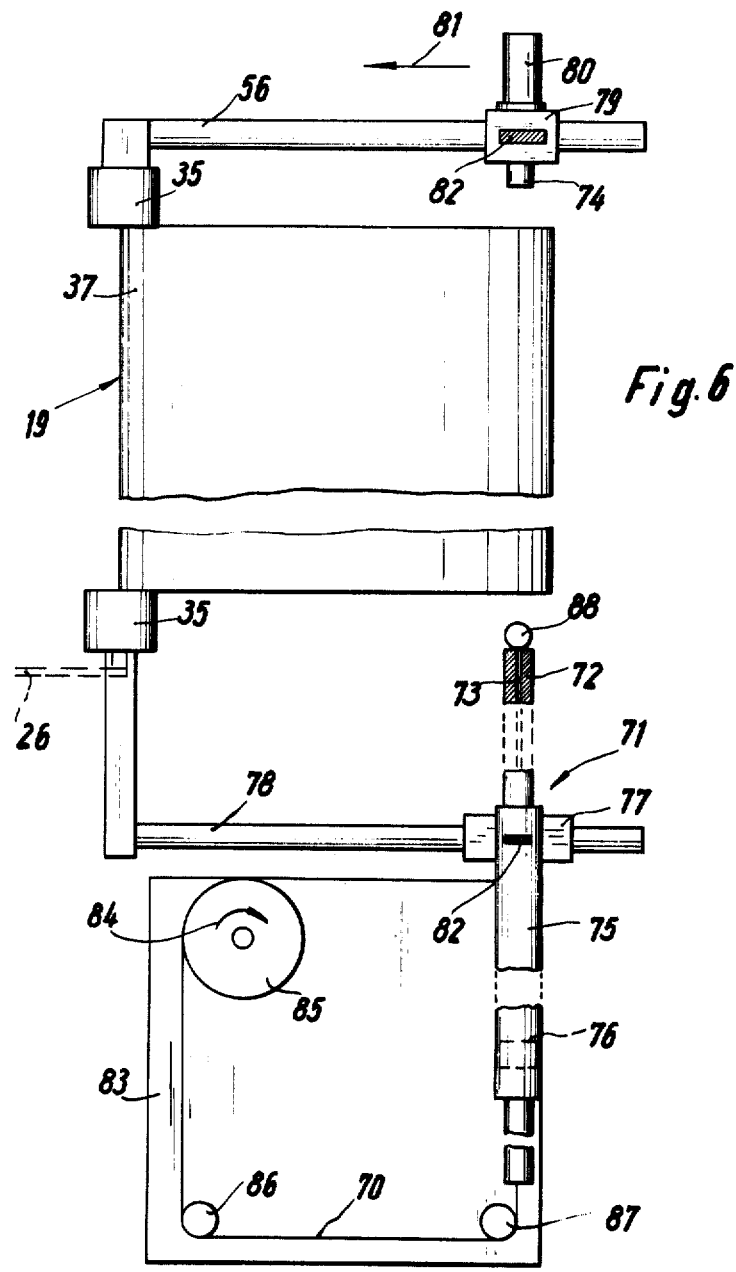
FIG. 6 is a further example of an embodiment of an arrangement in accordance with the present invention, with the view being a simplified top view, similar to FIG. 4.

In the case of narrower pressed rubber sheets, in accordance with a further development in the form of embodiment, it is possible, instead of the bar knife deviating slide 61, to provide a bar knife forward driving arrangement (not shown) with a hydraulically actuated piston/cylinder assembly that operates against bar knife slide 51 wherein, additionally, is brought in a pivoting positioning member for the purpose of pivoting the bar knife 50 about pivot pin 59. In this case, the bar knife cantilevers freely inside clamps or pincers 19 and is, especially at its free end, introduced between jaw elements 36 and 37 in pincers 19, through the expanded fold of pressed rubber sheet 1 during cutting. In the example of embodiment in accordance with FIG. 6, where the same reference numerals are used, insofar as they relate to the same or similar components, as in FIGS. 1 through 5, next to one side of pincers 19, in a plane of movement of the pincers running between jaw elements 36 and 37 or groups of jaws, as well as parallel and relative to the output of the cooling installation, and behind the jaws, there is a cutting wire 70 that is movable through means of a triggering arrangement 71 that is attached to pincers 19, and through a driver in the form of a small-bore piston 72, corresponding in length to approximately the width of the pincers, provided with a central opening or bore 73, and connected to a grip 74 on the other side of the pincers. The small-bore piston 72 is introduced into a hydraulic or pneumatic cylinder that is to be actuated and connected to a step-piston 76 that is double-acting, by hydraulic fluid. Cylinder 75 is rigidly joined to a slide 77 that runs on a slide guide 78, which is rigidly connected to one of pincers gear units 35. Grip 74 is attached to a slide 79, which is drivable over guide rail 56 through means of a positioning motor 80, in the direction of arrow 81, from the position shown in FIG. 6, over to the other pincers gear unit 35. Slides 77 and 79 are rigidly connected to one another through means of a heavy U-rod 82, of which only the two vertical legs are visible in the drawing, so that with movement of slide 79, slide 77 is also simultaneously carried along.

Rigidly connected to cylinder 75 and slide 77 is a bearing plate 83 which supports a delivery spool 85, under tension in the direction of the curved arrow, for cutting wire 70, as well as two idler pulleys 86 and 87 for the cutting wire 70. In this manner, in all operating positions of small-bore piston 72, the cutting wire 70 is maintained under tension such that a gripping end 88 for cutting wire 70 is continually held under tension against the face of piston 72 that is opposite to grip 74. If, during operation, the jaws of clamp or pincers 19 have closed while grasping the fold of pressed rubber sheet 1, cylinder 75 is acted upon by the hydraulic fluid such that the small-bore piston 72, along with the cutting wire under tension 70, is moved against grip 74, through the fold of pressed rubber sheet 1, whereupon grip 74 grips onto gripping end 88 of cutting wire 70. Then the small-bore piston 72 is once again moved back to its original position outside of pincers 19. There next follows movement of positioning motor 80 in the direction of movement of both slides 79 and 77 in the direction of arrow 81, against both pincers gear units 35, respectively against the concave inner surface of the fold of pressed rubber sheet 1, whereupon the fold is cut through by means of cutting wire 70. After cutting through pressed rubber sheet 1, the small-bore piston 72 is again moved into pincers 19 until the face of the small-bore piston 72 rests against gripping end 88 of cutting wire 70. Then, grip 74 is opened and releases cutting wire 70. Finally, the small-bore piston 72 is again moved back to the original position shown in FIG. 6, whereupon cutting wire 70 is rewound onto delivery spool 85, which is under tension.

I claim:

1. In apparatus for the removal of pressed rubber sheets from a sheet cooling installation and for ultimate delivery onto a receiving station, and wherein each pressed rubber sheet is passed through said sheet cooling installation while individually folded generally midway upon itself and deposited onto and retained on an associated hanger bar in hairpin fashion, with both end portions depending downwardly therefrom:
   a. drive chain means forming a conveyor with said conveyor having an output end, elongated hanger bars coupled to said drive chain and extending generally parallelly to one another at spaced apart intervals to effect a feed motion generally perpendicular to the elongated axis of said hanger bars;
   b. gripping means extending parallel to said hanger bars and being intermittently reciprocable adjacent the output end of said conveyor and arranged to grasp pressed rubber sheets from said hanger bars at a point adjacent said top fold, said gripping means including a pair of converging clamping members forming a jaw;
   c. cutting means disposed generally within the confines of said jaw and arranged to sever said pressed rubber sheet along said fold area and within said jaw; and
   d. means for intermittently reciprocably opening said gripping means to deposit said severed pressed rubber sheet onto said receiving station.

2. Apparatus as defined in claim 1 being particularly characterized in that said cutting means includes a slide rail means arranged generally parallel to the axis of said jaw and to the plane of said hold-down bars, a rotating cutting disk mounted upon said slide rail means and having a circumferential cutting edge, drive means coupled to said cutting disk and being arranged to move said disk along a plane generally parallel with the plane of said jaws and across the full width of said pressed rubber sheet.

3. The apparatus as defined in claim 2 being particularly characterized in that said drive means moves said cutting disk in forward and return reciprocating strokes and wherein said cutting operation occurs upon the return stroke.

4. The apparatus as defined in claim 3 being particularly characterized in that said drive means is arranged for reciprocal motion across the full width of said pressed rubber sheet.

5. The apparatus as defined in claim 3 being particularly characterized in that said drive means is arranged to perform a cutting stroke during movement of said clamping members and prior to deposit of the pressed rubber sheet onto the receiving station.

6. The apparatus as defined in claim 3 being particularly characterized in that the rotational direction of said cutting disk is opposed to the direction of movement of said cutting disk against said pressed rubber sheet during cutting.

7. The apparatus as defined in claim 6 being particularly characterized in that said cutting disk is driven with a motor having reversible directions of rotation, and wherein said motor is effective only during one driving event across said pressed rubber sheet.

8. The apparatus as defined in claim 2 being particularly characterized in that said drive means is driven with a hydraulic cylinder.

9. The apparatus as defined in claim 2 being particularly characterized in that said drive means includes motor means having a driving pinion in mesh with rack gear means extending generally parallel to said jaw.

10. In apparatus for the removal of pressed rubber sheets from a sheet cooling installation and for ultimate delivery onto a receiving station, and wherein each pressed rubber sheet is passed through said sheet cooling installation while individually folded generally midway upon itself and deposited onto and retained on an associated hanger bar in hairpin fashion, with both end portions depending downwardly therefrom:
   a. drive chain means forming a conveyor with said conveyor having an output end, elongated hanger bars coupled to said drive chain and extending generally parallelly to one another at spaced apart intervals to effect a feed motion generally perpendicular to the elongated axis of said hanger bars;
   b. gripping means extending parallel to said hanger bars and being intermittently reciprocable adjacent the output end of said conveyor and arranged to grasp pressed rubber sheets from said hanger bars at a point adjacent said top fold, said gripping means including a pair of converging clamping members forming a jaw;
   c. cutting means secured to said jaw and arranged to sever said pressed rubber sheet along said fold area and within said jaw; and
   d. means for intermittently reciprocably opening said gripping means to deposit said severed pressed rubber sheet onto said receiving station.

11. The apparatus as defined in claim 10 being particularly characterized in that said cutting means includes an elongated bar knife mounted for reciprocal motion laterally outwardly of said clamping members during forward movement of said clamping members, said reciprocatory means including means for driving said bar knife inwardly between said clamping members and within said jaw, said driving means further including slide means for carrying at least one end of said bar knife through the plane of the folded portion of said folded rubber sheet.

12. Apparatus as set forth in claim 11 being particularly characterized in that said bar knife is coupled at one end to a generally vertically disposed pivot pin for pivotally moving said bar knife generally forwardly thereabout.

13. Apparatus as set forth in claim 12 being particularly characterized in that said pivot pin is disposed laterally outwardly of said clamping jaw.

14. Apparatus as defined in claim 12 being particularly characterized in that means are provided for moving said bar knife forwardly against the concave inner surface of the fold of said pressed rubber sheet, with differential forward motion from one end to the other.

15. Apparatus as defined in claim 10 being particularly characterized in that said cutting means includes a cutting wire movable reciprocatorily from normal retracted disposition to a forwardly extending cutting position, and means for moving said cutting wire against the concave inner surface of the fold of the rubber sheet, and sensing means coupled to said clamping jaw for controlling the motion of said cutting wire.

16. Apparatus as defined in claim 15 being particularly characterized in that said sensing means includes a cylinder having a rod with an axial length approximately equal to said jaw width, and having a central bore formed therein for receiving said cutting wire under tension, and means for moving said cutting wire forwardly against the fold of the rubber sheet upon closure of said jaw.

* * * * *